United States Patent
Yang et al.

(10) Patent No.: US 7,664,062 B2
(45) Date of Patent: Feb. 16, 2010

(54) METHOD FOR ADJUSTING TRANSMISSION RATE OF WIRELESS COMMUNICATION SYSTEM

(75) Inventors: Shan-An Yang, ChangHua (TW); San-Ho Wei, YunLin (TW); Kuang-Yu Yen, TaiChung (TW)

(73) Assignee: Realtek Semiconductor Corp., Hsinchu (TW)

( * ) Notice: Subject to any disclaimer, the term of this patent is extended or adjusted under 35 U.S.C. 154(b) by 820 days.

(21) Appl. No.: 10/785,086

(22) Filed: Feb. 25, 2004

(65) Prior Publication Data
US 2004/0165575 A1 Aug. 26, 2004

(30) Foreign Application Priority Data
Feb. 26, 2003 (TW) .............................. 92104605 A

(51) Int. Cl.
*H04B 7/00* (2006.01)
*H04L 12/26* (2006.01)
(52) U.S. Cl. ...................................... 370/310; 370/252
(58) Field of Classification Search ................. 375/265; 370/278, 252, 370, 330, 338; 455/67.1
See application file for complete search history.

(56) References Cited

U.S. PATENT DOCUMENTS 7,099,398 B1 * 8/2006 Girardeau et al. ........... 375/265

| 2001/0022806 | A1* | 9/2001 | Adachi ........................ 375/133 |
|---|---|---|---|
| 2002/0105925 | A1 | 8/2002 | Shoemake |
| 2002/0141349 | A1* | 10/2002 | Kim et al. .................... 370/252 |
| 2003/0166394 | A1* | 9/2003 | Tsien et al. ................. 455/67.1 |
| 2004/0101035 | A1* | 5/2004 | Boer et al. .................. 375/219 |
| 2005/0129005 | A1* | 6/2005 | Srikrishna et al. ........... 370/356 |

FOREIGN PATENT DOCUMENTS

FR  EP 1 220 485  * 7/2002

OTHER PUBLICATIONS

Webster, et al.; "Introducing the Harris-Lucent Compromise Proposal for TGb;" Jun. 26, 1998, pp. 1-11.

* cited by examiner

*Primary Examiner*—George Eng
*Assistant Examiner*—Michael Faragalla
(74) *Attorney, Agent, or Firm*—Thomas, Kayden, Horstemeyer & Risley

(57) ABSTRACT

The present invention provides a method for dynamically adjusting the transmission rate of a wireless communication system. The method comprises the steps of: setting an initial transmission rate; counting the number of successful or unsuccessful transmission; comparing the number with a predetermined threshold and obtaining a comparing result; and adjusting the transmission rate according to the comparing result. The present invention also provides a method that uses the strength of received signals to determine if the transmission rate needs adjusting.

16 Claims, 9 Drawing Sheets

METHOD FOR ADJUSTING TRANSMISSION RATE OF WIRELESS COMMUNICATION SYSTEM

BACKGROUND OF THE INVENTION (a). Field of the Invention

This invention relates to a method for adjusting the transmission rate, and more particularly, to a method for adjusting the transmission rate of a wireless communication system.

(b). Description of the Related Arts

Nowadays, the requirement of efficiency and quality for communication systems rises. Some communication systems provide various transmission rates. For example, the IEEF 802.11b provides four different transmission rates, 11 Mbps, 5.5 Mbps, 2 Mbps, and 1 Mbps. A user can choose the most suitable transmission rate according to the quality of communication environment. A high transmission rate is chosen if the channel is in a good condition. If the channel fading is very significant, the received signal strength is weak and/or the signal-to-noise ratio is low. Using a low transmission rate under such condition would render a larger throughput than using a high transmission rate.

The conventional approach to adjust the transmission rate by end users themselves is not appropriate because most of the end users do not have proper knowledge in choosing the most suitable transmission rate. Besides, the users may change positions constantly which results in changes of the communication environment In this situation, the users will have to continuously adjust the transmission rate in order to maintain or increase the throughput.

SUMMARY OF THE INVENTION

It is therefore one of the many objectives of the present invention to provide a method for dynamically adjusting the transmission rate of a wireless communication system. This method can automatically adjust the transmission rate to a proper level according to the channel conditions. Therefore, the users need not to choose the transmission rate and the system throughput can be improved.

According to embodiments of the present invention, a method for adjusting a transmission rate of a wireless communication system is disclosed. The communication system comprises a transmitter and a receiver, wherein the transmitter transmits a plurality of transmitted packets to the receiver, and the receiver receives a plurality of received packets from the transmitter. The method comprises the steps of setting at least a transmission rate; transmitting the transmitted packets at the transmission rate within a predetermined time interval; determining at least a state parameter according to at least a characteristic of the transmitting/receiving process between the transmitter and the receiver; and adjusting the transmission rate according to the state parameter.

These and other objectives of the present invention will no doubt become obvious to those of ordinary skill in the art after reading the following detailed description of the embodiments that is illustrated in the various figures and drawings.

DETAILED DESCRIPTION OF THE EMBODIMENTS

Figure 1:
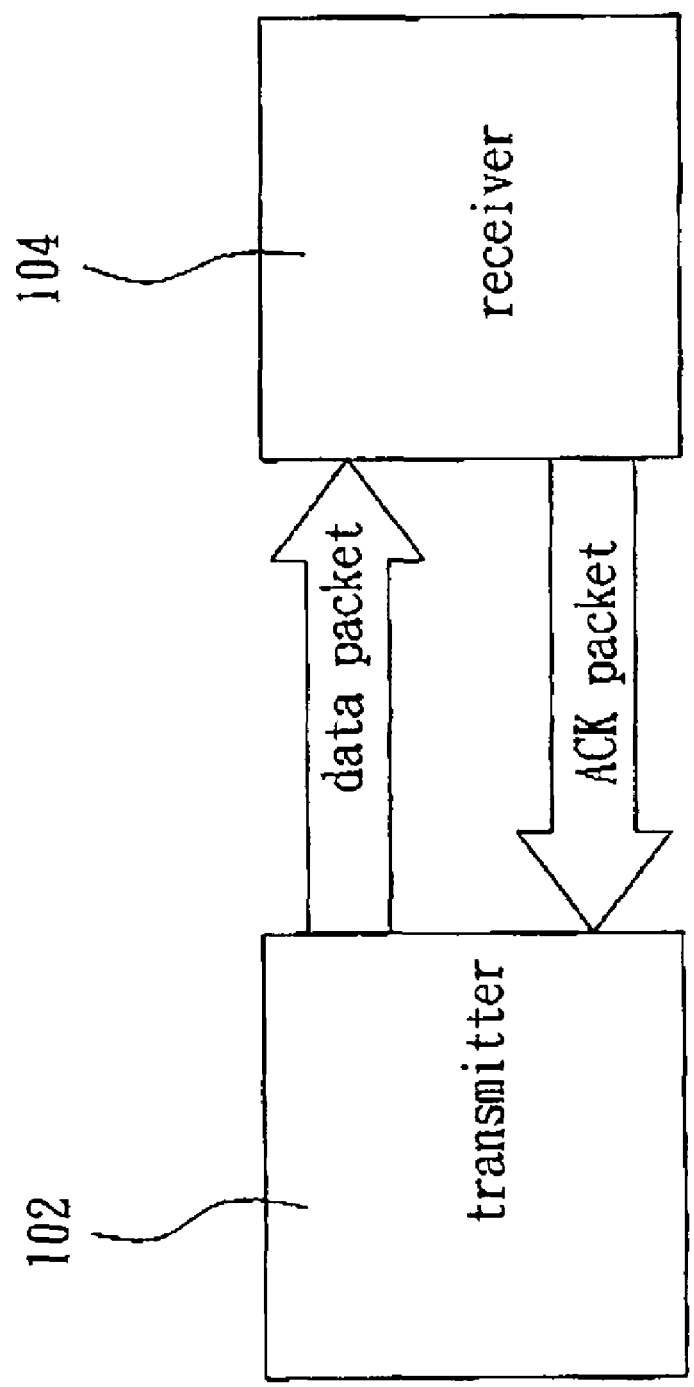
FIG. 1 illustrates the packet transmission and acknowledgement mechanism of an IEEE 802.11 communication system.

FIG. 1 illustrates the packet transmission and acknowledgement mechanism of a wireless communication system, where an IEEE 802.11b communication system can be an example thereof. In FIG. 1, according to the standard of IEEE 802.11b, after the transmitter 102 transmits a data packet to the receiver 104, the receiver 104 will demodulate the received data packet and perform a CRC check. If the data packet is received correctly, the receiver 104 will reply an acknowledgement (ACK) packet to the transmitter 102. If the ACK packet is not received by the transmitter 102 within a predetermined period of time, the transmitter 102 will assume that the data packet is not received correctly by the receiver 104 and then re-transmit the previous packet to the receiver 104.

The method of the present invention is suitable for a communication system with multiple transmission rates, such as, but not limited to the IEEE 802.11b system, which has four transmission rates (1 Mbps, 2 Mbps, 5.5 Mbps, and 11 Mbps), or the IEEE 802.11a system, which has eight transmission rates (6 Mbps, 9 Mbps, 12 Mbps, 18 Mbps, 24 Mbps, 36 Mps, 48 Mbps, and 54 Mbps).

Figure 2:
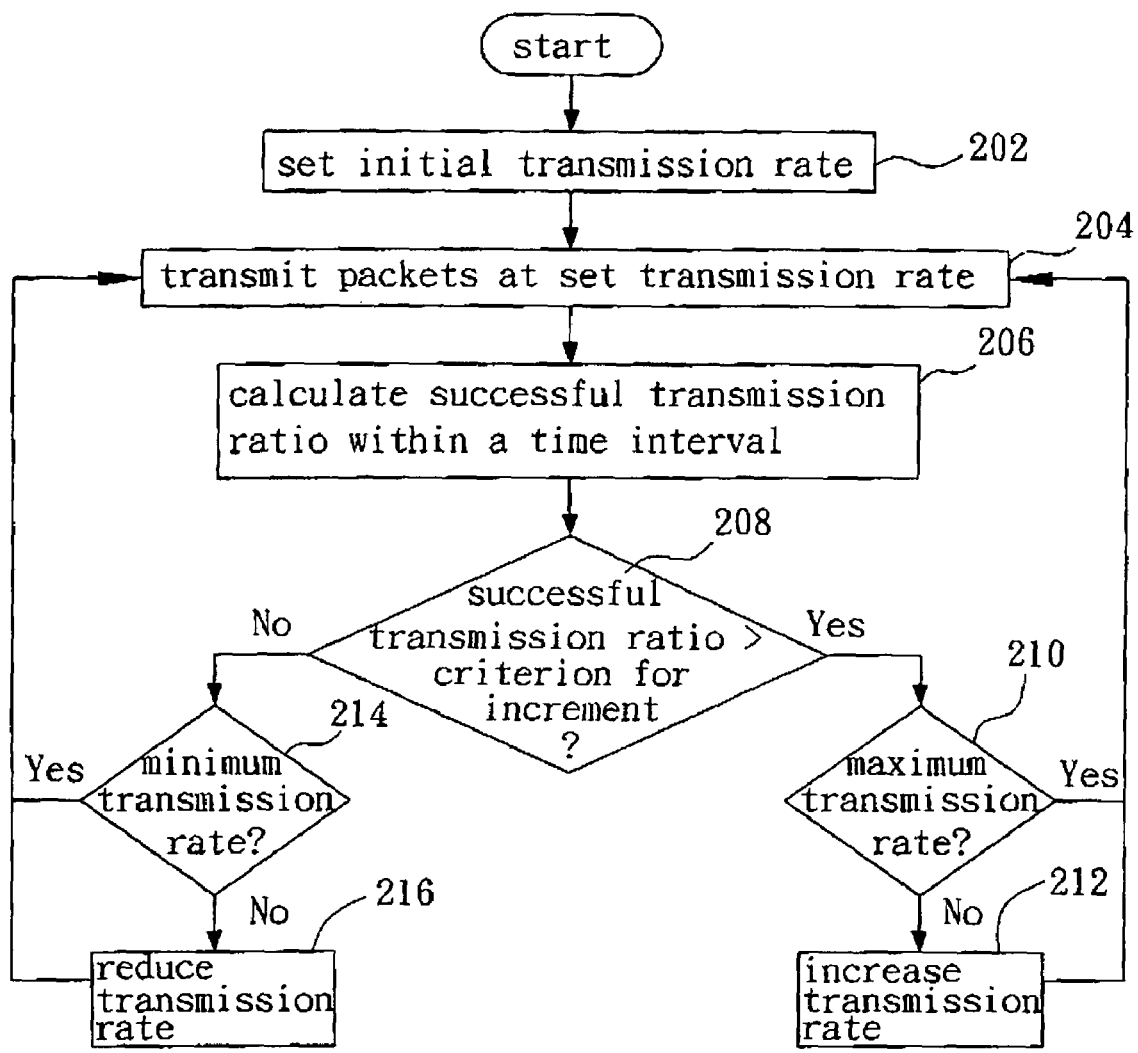
FIG. 2 illustrates a flowchart of a method for adjusting the transmission rate according to the first embodiment of the present invention.

FIG. 2 illustrates a flowchart of a method for adjusting the transmission rate according to the first embodiment of the present invention. In the first embodiment, the transmission rate of the communication system is adjusted automatically according to the re-transmitting mechanism described previously. The method of the first embodiment comprises the following steps: in step 202, an initial transmission rate is set. Next, in step 204, a data packet is transmitted at a set transmission rate, which in this case is the initial transmission rate, within a predetermined time interval. The, predetermined time interval can be defined by a clock signal of the communication system, the number of packets being transmitted, or the number of packets being successfully transmitted. Also, if the communication environment varies frequently, e.g. the user is moving constantly, then the predetermined time interval tends to be short. In step 206, a successful transmission ratio of the data packet within the predetermined time interval is calculated. The successful transmission ratio is defined as the number of received acknowledgement packets divided by the total number of packets being transmitted by the transmitter. The successful transmission ratio represents an effective transmission rate. Therefore, the successful transmission ratio represents the transmission efficiency of the communication system. Next, in step 208, the calculated successful transmission ratio within the predetermined time interval is compared to a first successful threshold, which is predetermined to be a criterion for increment. If the successful transmission ratio is greater than the first successful threshold (step 208) and the current transmission rate is the highest transmission rate of the communication system (step 210), the next transmission rate maintains the value of the current transmission rate. If the successful transmission ratio is greater than the first successful threshold (step 208) and the current transmission rate is not the highest transmission rate of the communication system (step 210), the next transmission rate is increased to be a higher value than the current transmission rate (step 212). In contrast, if the successful transmission ratio is lower than the first successful threshold, it indicates that the current throughput is not desirable. Therefore, the system throughput can potentially be improved if the packets are transmitted at a lower transmission rate. In this situation, if the current transmission rate is the lowest transmission rate of the system, the next transmission rate maintains the value of the current transmission rate. If the current transmission rate is not the lowest transmission rate of the system, the next transmission rate is reduced to be a lower value than the current transmission rate (step 216).

Figure 3:
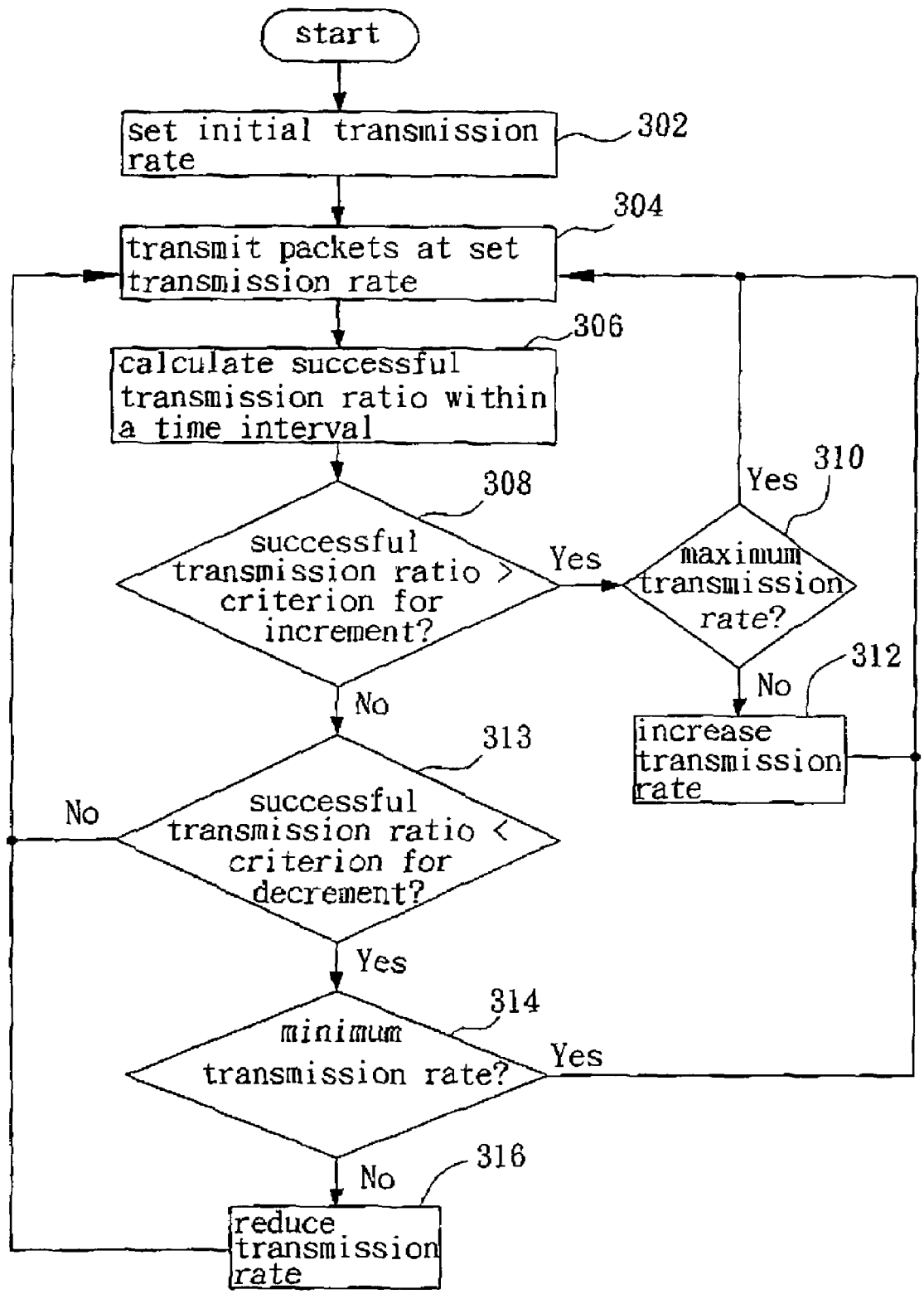
FIG. 3 illustrates a flowchart of a method for adjusting the transmission rate according to the second embodiment of the present invention.

FIG. 3 illustrates a flowchart of a method for adjusting the transmission rate according to the second embodiment of the present invention. The steps 302 through 316 are similar to the corresponding steps 202 through 216 of FIG. 2 respectively, and detailed descriptions are therefore omitted herein for simplicity. Comparing to the first embodiment in FIG. 2, which only includes a criterion for increment, the second embodiment introduces a criterion for decrement by utilizing a second successful threshold. The second successful threshold is served as the threshold for the communication system to determine whether to reduce the transmission rate. In FIG. 3, if the successful transmission ratio is determined to be higher than the first successful threshold in step 308, then the step 313 is executed to further check if the successful transmission ratio is lower than the second successful threshold. If the successful transmission ratio is lower than the second successful threshold, it indicates that the current condition of transmission channel is worse than the preset standard of the communication system. Thus, the system throughput may be increased if the next transmission rate is reduced. If the current transmission rate is the lowest transmission rate of the system, the next transmission rate maintains the value of the current transmission rate. If the current transmission rate is not the lowest transmission rate of the system, then the next transmission rate is reduced (step 316). If the successful transmission ratio is between the first and second successful thresholds, it indicates that the current transmission rate is suitable for the current status of the communication system.

It is noted that the first and the second successful thresholds can be properly set according to different transmission rates. The thresholds can be determined by experiment results. In the above two embodiment, the transmission rate can be adjusted not only by the successful transmission ratio but also by a failure transmission ratio which is calculated by dividing the number of ACK packets which are not received by the transmitter by the number of total transmitted packets.

Figure 4:
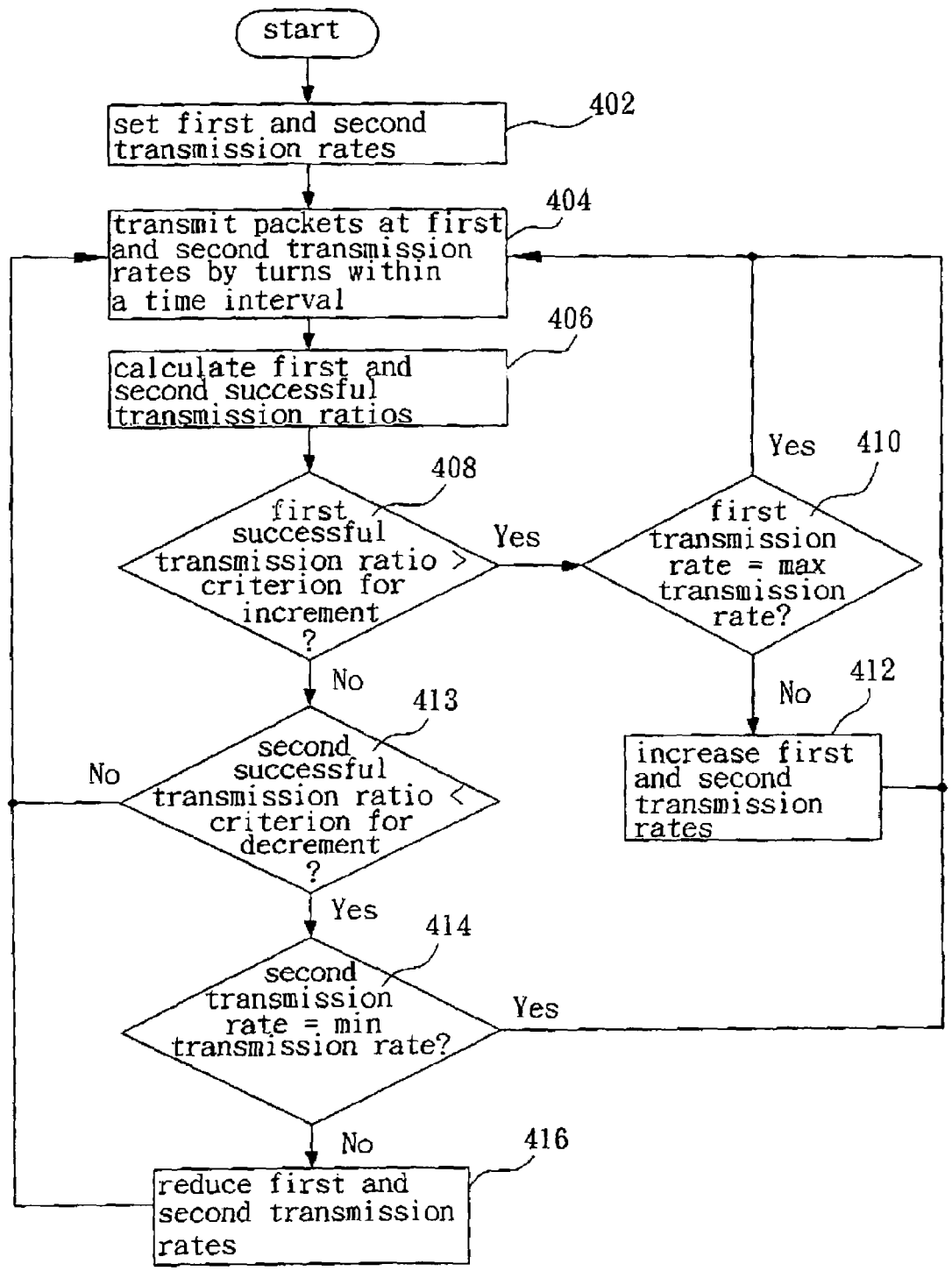
FIG. 4 illustrates a flowchart of a method for adjusting the transmission rate according to the third embodiment of the present invention.

FIG. 4 illustrates a flowchart of a method for adjusting the transmission rate according to the third embodiment of the present invention. In this embodiment, the communication system utilizes two transmission rates for packet transmission. The communication system compares the successful transmission ratios of these two transmission rates, and adjusts to the next transmission rate automatically. This embodiment comprises several steps. In step 402, a first transmission rate and a second transmission rate are set, wherein the first transmission rate is greater than the second transmission rate. In step 404, data packets are transmitted at the first transmission rate and at the second transmission rate respectively within a predetermined time interval. The determination of the predetermined time interval is as earlier described. In this embodiment, the data packets are transmitted at the first transmission rate and at the second transmission rate by turns. However, the utilization of the two transmission rates is not limited to alternation of one after the other. Moreover, since the first transmission rate is higher than the second transmission rate, in order to raise the total transmission rate of the communication system, the data packets transmitted at the first transmission rate should be much more than those transmitted at the second transmission rate. In step 406, two successful transmission ratios are calculated with respect to the first transmission rate and the second transmission rate within the predetermined time interval and are termed as the first successful transmission ratio and the second successful transmission ratio respectively. The definition of these successful transmission ratios is the same as that defined previously. In this embodiment, a first threshold and a second threshold are used to determine whether the next transmission rate needs to be increased or reduced. That is, the first threshold is used as a criterion for increment, while the second threshold is used as a criterion for decrement. After calculating the first and second successful transmission ratios, step 408 is executed to check if the first successful transmission ratio is higher than the first threshold. As described previously, the quality of the communication environment is one of the major factors to influence the system throughput. If the first successful transmission ratio is higher than the first threshold, it indicates that the effective transmission rate may be increased if the transmission rates of the communication system are increased. Thus, if the first successful ratio is higher than the first threshold, step 410 is executed to check if the current first transmission rate is the highest transmission rate. If so, the next first and second transmission rates maintain values of the current transmission rates. Otherwise, the next first and second transmission rates are increased. If the first successful transmission ratio is not higher than the first threshold and the second successful transmission ratio is lower than the second threshold, it indicates that the current throughput is worse than the preset standard of the communication system. Therefore, step 414 is executed to check if the current second transmission rate is the lowest transmission rate of the system. If not, step 416 is executed so both the next first and second transmission rates are reduced.

Figure 5:
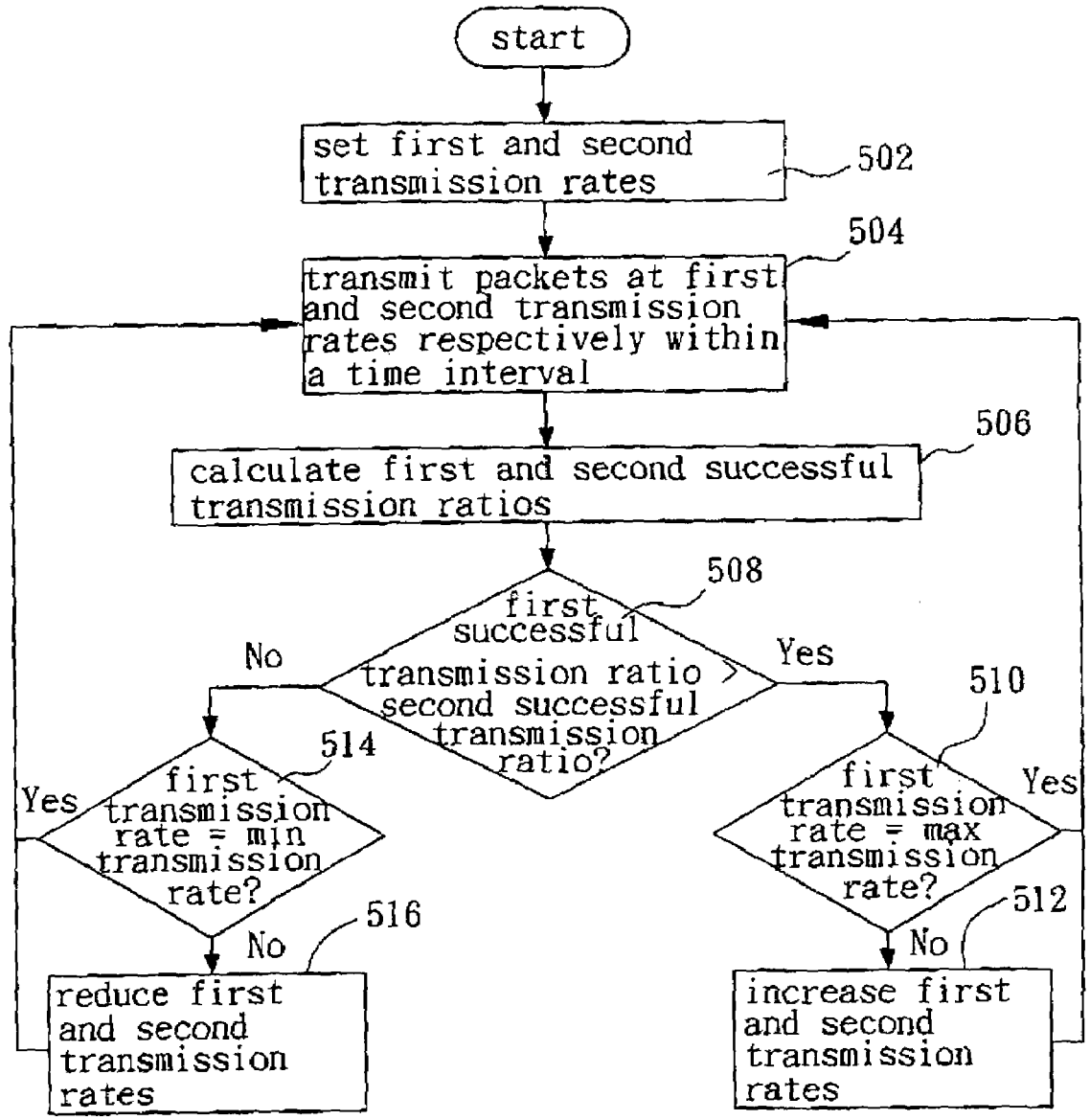
FIG. 5 illustrates a flowchart of a method for adjusting the transmission rate according to the fourth embodiment of the present invention.

FIG. 5 illustrates a flowchart of a method for adjusting the transmission rate according to the fourth embodiment of the present invention. Similar to the third embodiment, the fourth embodiment uses two transmission rates to transmit the packets, compares the successful transmission ratios at these two transmission rates, and automatically adjusts the next transmission rates. However, the fourth embodiment does not require the criterions for increment and for decrement. In step 506, the first successful transmission ratio and the second successful transmission ratio are calculated. In step 508, the first and second successful transmission ratios are compared. The definition of the first and second successful transmission ratios is the same as previously described. If the first successful transmission ratio is higher than the second successful transmission ratio, it indicates that the first transmission rate is more suitable for the current communication environment.

In other words, a higher transmission rate is better. Step 510 is then executed to check if the first transmission rate is the highest transmission of the communication system. If not, step 512 is executed in which both the first and second transmission rates are increased. As a result, the system throughput may be improved. In contrast, if the first successful transmission ratio is lower than the second successful transmission ratio, it indicates the second transmission rate, i.e., the lower one, is more suitable for the current communication environment. Thus, step 514 is executed to check if the second transmission rate is the lowest transmission rate of the communication system. If not, step 516 is executed in which both the first and second transmission rates are reduced. As a result, the system throughput may be improved.

As described above, other factors, such as the received signal strength, can also serve as the criterion for judging the quality of the communication environment and adjusting the transmission rate. By adjusting the transmission rate according to both the successful transmission ratio and the received signal strength, the system throughput can be optimized even further.

Figure 6:
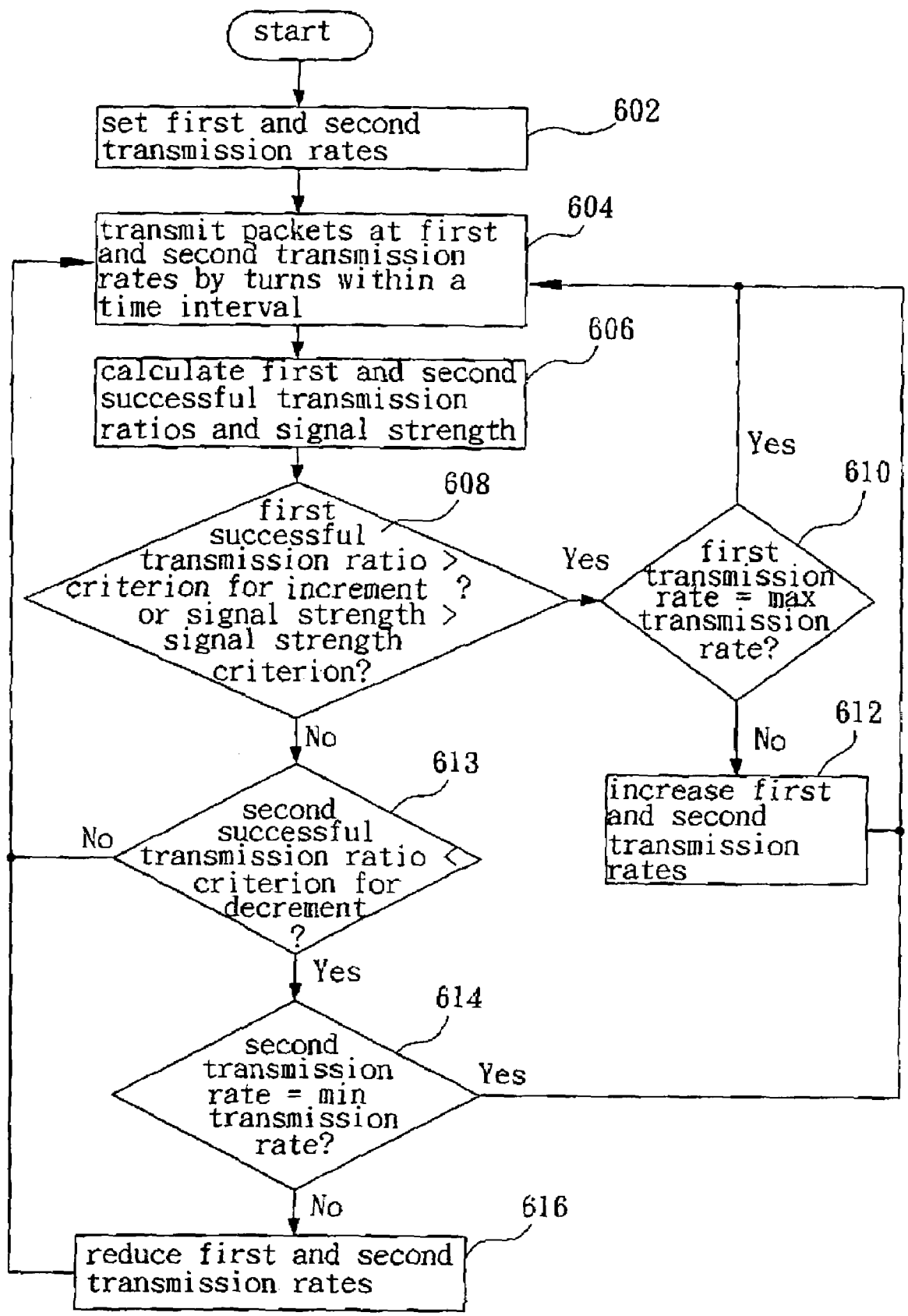
FIG. 6 illustrates a flowchart of a method for adjusting the transmission rate according to the fifth embodiment of the present invention.
Figure 7:
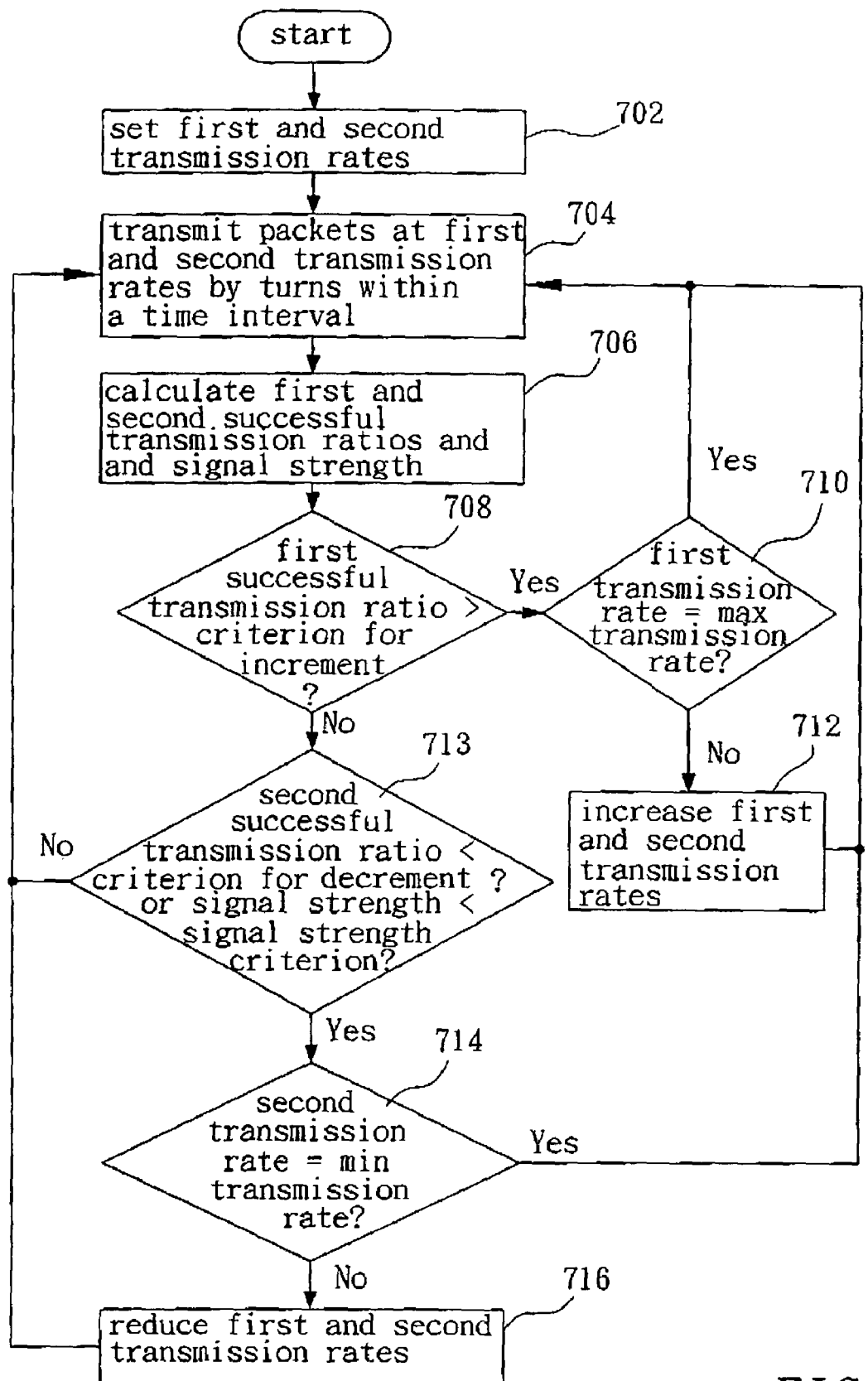
FIG. 7 illustrates a flowchart of a method for adjusting the transmission rate according to the sixth embodiment of the present invention.

There can be various embodiments that combine both the successful transmission ratio and the received signal strength to judge the quality of the communication environment. The fifth and sixth embodiments are provided herein as two examples, while it is obvious that the present invention is not limited thereto. FIG. 6 illustrates a flowchart of a method for adjusting the transmission rate according to the fifth embodiment of the present invention. In this embodiment, not only the first and second successful transmission ratios are calculated in step 606, the received signal strength within the predetermined time interval is also determined. In step 608, if the received signal strength is higher than a strength threshold, it indicates that the bit error rate (BER) of received packets is low. Thus, the throughput may be increased if the transmission rate is increased. Therefore, when the first successful transmission ratio is higher than the criterion for increment or the received signal strength is larger than the strength threshold, it indicates that the quality of the communication environment is good. As a result, the first and second transmission rates are increased such that the system throughput is improved. FIG. 7 shows the sixth embodiment of the present invention. This embodiment is different from the fifth embodiment in that the received signal strength is used to determine whether to reduce the transmission rate. In step 713, the received signal strength is compared to a strength threshold. If the received signal strength is lower than the strength threshold and the second successful transmission ratio is lower than the reducing criterion, it indicates that the quality of the communication environment is not good. As a result, reducing the transmission rate is taken into consideration in subsequent steps 714 and 716 in order to improve the system throughput.

In addition to the quality of the communication environment, other factors such as using the RTS/CTS (Request To Send/Clear TL) Send) mechanism or not, using long preamble or short preamble, etc. will also affect the system throughput. For example, in a condition that very few users are active in the whole communication environment, using the RTS/CTS mechanism may waste time and decrease the system throughput since the possibility of packet collision is very low. In contrast, if there are many users in the communication environment, the possibility of packet collision is increased. Since the RTS/CTS mechanism can avoid packet collision, the system throughput may be increased if the RTS/CTS mechanism is used. Therefore, the aforementioned factors can be considered together to improve the system throughput.

The seventh and eighth embodiments combine the RTC/CTS mechanism with the previous embodiments for adjusting the transmission rate.

Figure 8:
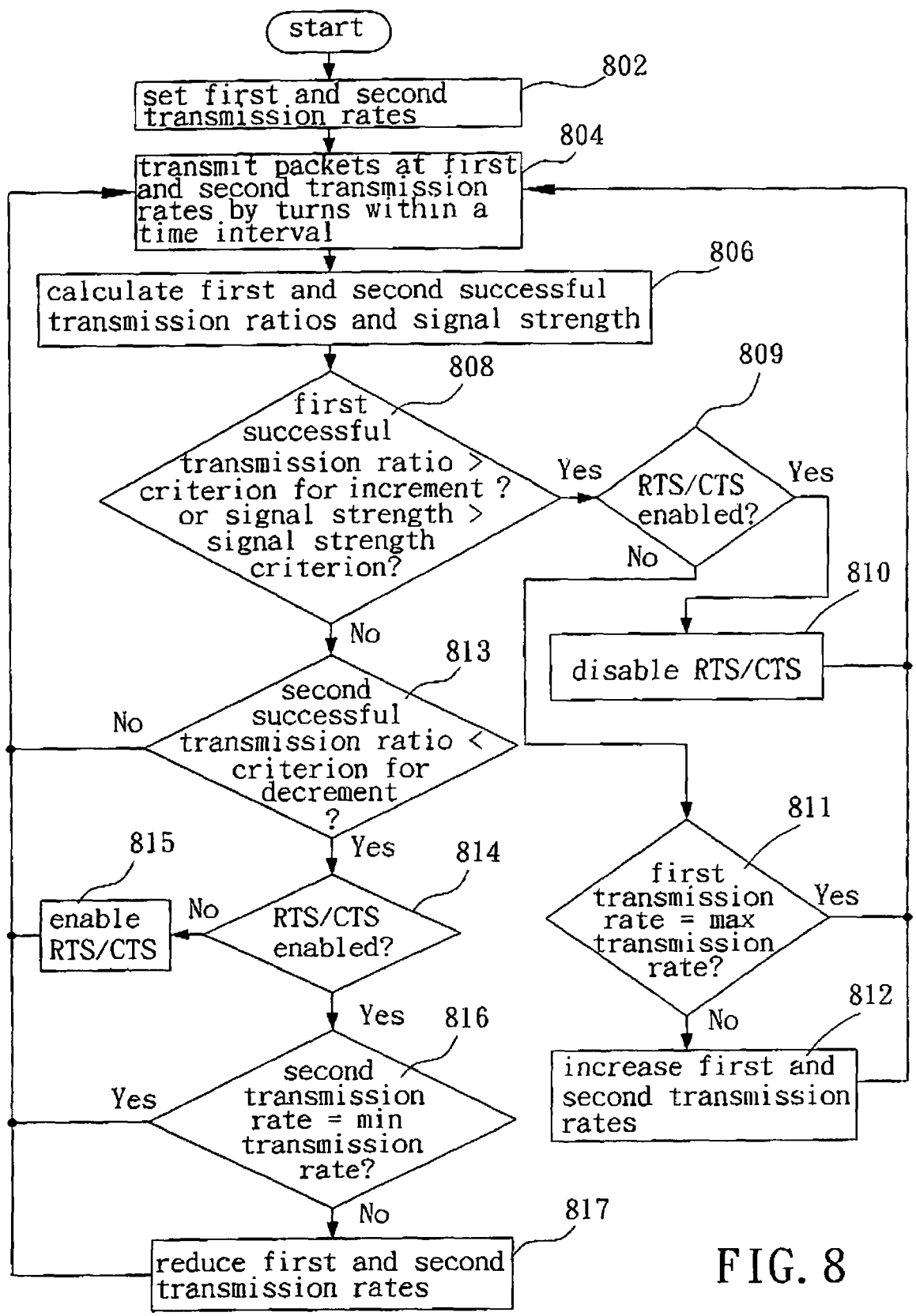
FIG. 8 illustrates a flowchart of a method for adjusting the transmission rate according to the seventh embodiment of the present invention.

FIG. 8 illustrates a flowchart of a method for adjusting the transmission rate according to the seventh embodiment of the present invention. This embodiment adds the RTS/CTS mechanism into the fifth embodiment and the differences between them are described as follows. In step 808, when the first successful transmission ratio is higher than the increasing criterion or the received signal strength is greater than the strength threshold, the flow proceeds to step 809 to check whether the RTS/CTS mechanism is used or not. If the first successful transmission ratio is higher than the increasing criterion or the average received signal strength is greater than the strength threshold, it indicates that the current communication environment is good. It is possibly due to that there are few users in the communication environment. If the RTS/CTS mechanism is currently being used, step 810 is executed to disable the RTS/CTS mechanism. Thus, the system throughput can be increased in the condition that few users exist in the communication environment. In contrast, if the RTS/CTS mechanism is not currently being used, step 811 and 812 are executed to determine if the next first and second transmission rates should be increased. In additions, in step 813, if the second successful transmission ratio is lower than the reducing criterion, it indicates that the quality of the current communication environment is not good. It is possibly due to that there are many users in the communication environment. Thus, step 814 is executed to check if the RTS/CTS mechanism is currently used. If the RTS/CTS mechanism is not currently being used, step 815 is executed to enable the RTS/CTS mechanism. Thus, the throughput can be increased while many users are present in the communication environment. In contrast, if the RTS/CTS is currently being used, step 816 and step 817 are executed to check if the next first and second transmission rates should be decreased in this bad communication environment.

Figure 9:
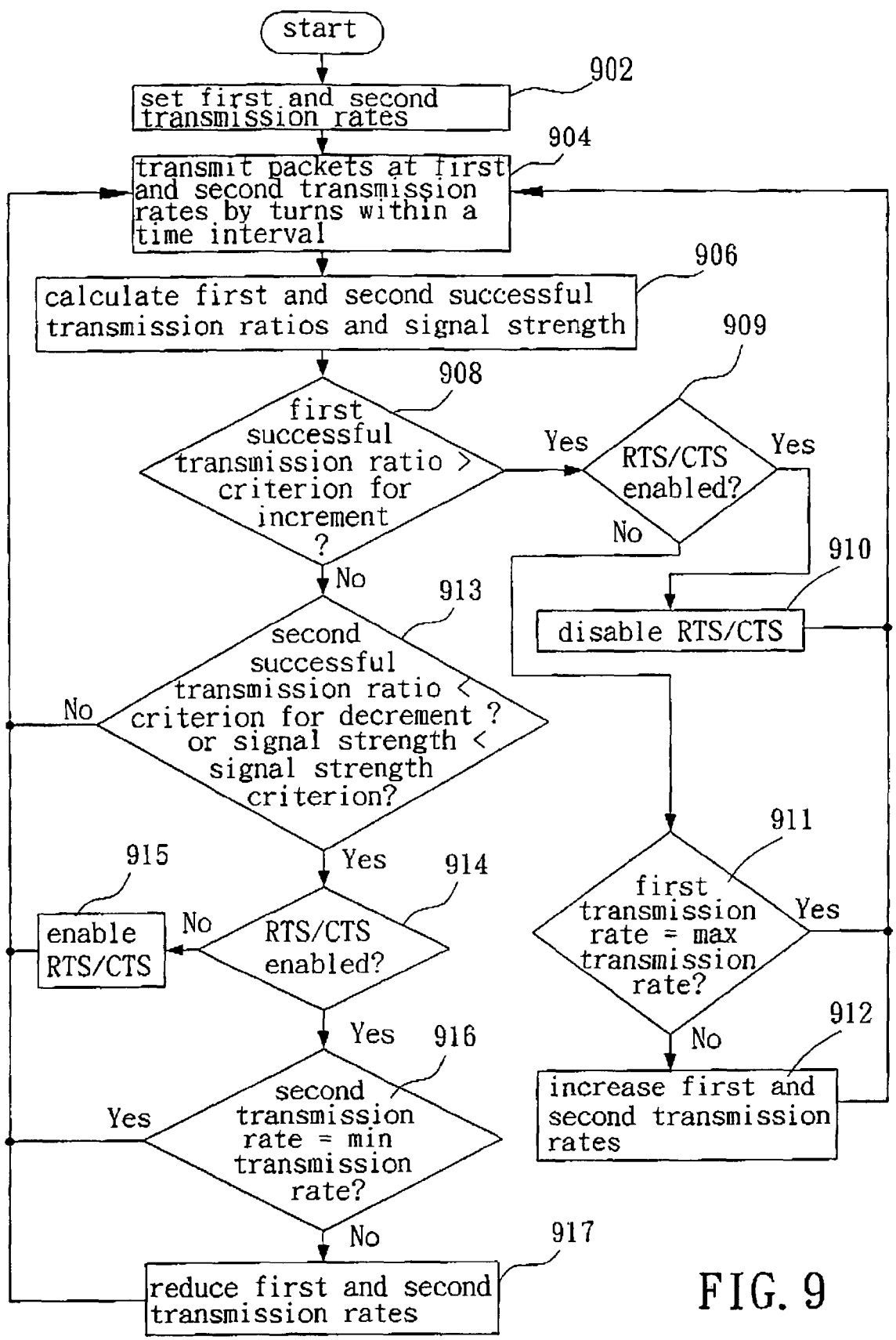
FIG. 9 illustrates a flowchart of a method for adjusting the transmission rate according to the eighth embodiment of the present invention.

FIG. 9 illustrates a flowchart of a method for adjusting the transmission rate according to the eighth embodiment of the present invention. The eighth embodiment combines the third embodiment of FIG. 4 with the RTS/CTS mechanism. The manner of combination is similar to that described previously in the seventh embodiment.

Those skilled in the art will readily observe that numerous modifications and alterations of the device may be made while retaining the teachings of the invention, Accordingly, that above disclosure should be construed as limited only by the metes and bounds of the appended claims.

What is claimed is:

1. A method for adjusting a transmission rate of a wireless communication system comprising a transmitter and a receiver, the method comprising:

counting a number of first transmitted packets within a predetermined time interval, the first transmitted packets being transmitted by the transmitter at a first transmission rate;

counting a number of first acknowledgement packets received by the receiver, each of the first acknowledgement packets representing a successful transmission of one of the first transmitted packets;

counting a number of second transmitted packets within the predetermined time interval, the second transmitted packets being transmitted by the transmitter at a second transmission rate, the second transmission rate being lower than the first transmission rate;

counting a number of second acknowledgement packets received by the receiver, each of the second acknowledgement packets representing a successful transmission of one of the second transmitted packets;

judging whether a first relationship between the number of first transmitted packets and the number of first acknowledgement packets satisfies an increment criterion;

judging whether the first transmission rate exceeds a maximum transmission rate;

increasing the first transmission rate if the first relationship satisfies the increment criterion and the first transmission rate is not above the maximum transmission rate;

judging whether a second relationship between the number of second transmitted packets and the number of second acknowledgement packets satisfies a decrement criterion;

judging whether the second transmission rate is below a minimum transmission rate; and decreasing the second transmission rate if the second relationship satisfies the decrement criterion and the second transmission rate is not below the minimum transmission rate.

2. A method for adjusting a transmission rate of a wireless communication system comprising a transmitter and a receiver, the method comprising:

counting a number of first transmitted packets within a predetermined time interval, the first transmitted packets being transmitted by the transmitter at a first transmission rate;

counting a number of first acknowledgement packets received by the receiver, each of the first acknowledgement packets representing a successful transmission of one of the first transmitted packets;

counting a number of second transmitted packets within the predetermined time interval, the second transmitted packets being transmitted by the transmitter at a second transmission rate, the second transmission rate being lower than the first transmission rate;

counting a number of second acknowledgement packets received by the receiver, each of the second acknowledgement packets representing a successful transmission of one of the second transmitted packets;

calculating a first relationship between the number of first transmitted packets and the number of first acknowledgement packets, and a second relationship between the number of second transmitted packets and the number of second acknowledgement packets;

judging whether the first transmission rate exceeds a maximum transmission rate;

judging whether the second transmission rate is below a minimum transmission rate;

comparing the first relationship with the second relationship and thereby generating a result;

increasing the first transmission rate if the result satisfies an increment criterion and the first transmission rate is not above the maximum transmission rate; and decreasing the second transmission rate if the result satisfies a decrement criterion and the second transmission rate is not below the minimum transmission rate.

3. The method of claim 1, wherein the operation of judging whether a first relationship between the number of first transmitted packets and the number of first acknowledgement packets satisfies an increment criterion more particularly comprises determining whether a first successful transmission ratio exceeds a first predetermined threshold, wherein the first successful transmission ratio is defined by a ratio of first acknowledgment packets and first transmitted packets.

4. The method of claim 1, wherein the operation of judging whether a second relationship between the number of second transmitted packets and the number of second acknowledgement packets satisfies a decrement criterion more particularly comprises determining whether a second successful transmission ratio is less than a second predetermined threshold, wherein the second successful transmission ratio is defined by a ratio of second acknowledgment packets and second transmitted packets.

5. The method of claim 1, wherein the operation of judging whether a second relationship between the number of second transmitted packets and the number of second acknowledgement packets satisfies a decrement criterion is only performed if the operation of judging whether a first relationship between the number of first transmitted packets and the number of first acknowledgement packets fails to satisfy the increment criterion.

6. The method of claim 3, wherein the operation of judging whether a second relationship between the number of second transmitted packets and the number of second acknowledgement packets satisfies a decrement criterion is only performed if the first successful transmission ratio does not exceed the first predetermined threshold.

7. The method of claim 2, wherein the operation of calculating a first relationship between the number of first transmitted packets and the number of first acknowledgement packets more specifically comprises calculating a first successful transmission ratio, wherein the first successful transmission ratio is defined by a ratio of first acknowledgment packets and first transmitted packets.

8. The method of claim 2, wherein the operation of calculating a second relationship between the number of second transmitted packets and the number of second acknowledgement packets more specifically comprises calculating a second successful transmission ratio, wherein the second successful transmission ratio is defined by a ratio of second acknowledgment packets and second transmitted packets.

9. The method of claim 2, wherein the operation of increasing the first transmission rate if the result satisfies an increment criterion and the first transmission rate is not above the maximum transmission rate more specifically comprises increasing the first transmission rate if a first successful transmission ratio exceeds a predetermined ratio.

10. The method of claim 2, wherein the first relationship is a first successful transmission ratio, and wherein the second relationship is a second successful transmission ratio.

11. The method of claim 10, wherein the operation of comparing the first relationship with the second relationship and thereby generating a result more specifically comprises determining whether the first successful transmission ratio exceeds the second successful transmission ratio.

12. A method for adjusting a transmission rate of a wireless communication system comprising a transmitter and a receiver, the method comprising:

computing a first successful transmission ratio, wherein the first successful transmission ratio is a ratio of first acknowledgment packets to first transmitted packets transmitted at a first transmission rate, within a predetermined time interval;

computing a second successful transmission ratio, wherein the second successful transmission ratio is a ratio of second acknowledgment packets to second transmitted packets transmitted at a second transmission rate, within a predetermined time interval, wherein the second transmission rate is lower than the first transmission rate;

increasing the first transmission rate, if the determining step determines that the first successful transmission ratio is larger than the second transmission ratio; and decreasing the first transmission rate, if the determining step determines that the first successful transmission ratio is not larger than the second transmission ratio.

13. The method of claim 12 further comprising:

increasing the second transmission rate, if the determining step determines that the first successful transmission ratio is larger than the second transmission ratio.

14. The method of claim 12 further comprising:

decreasing the second transmission rate, if the determining step determines that the first successful transmission ratio is not larger than the second transmission ratio.

15. The method of claim 12, wherein the operation of increasing the first transmission rate is performed only if the first transmission rate doesn't exceed a maximum transmission rate.

16. The method of claim 12, wherein the operation of decreasing the second transmission rate is performed only if the second transmission rate is not below a minimum transmission rate.

* * * * *